July 29, 1958 A. N. DE VAULT ET AL 2,845,410
FRACTIONATION OF POLYMERS
Filed Oct. 1, 1954 2 Sheets-Sheet 1

FIG. I.

INVENTORS
A. N. DE VAULT
W. N. AXE
BY *Hudson and Young*
ATTORNEYS

INVENTORS
A. N. DE VAULT
W. N. AXE
BY
*Hudson and Young*
ATTORNEYS

United States Patent Office 2,845,410
Patented July 29, 1958

2,845,410

FRACTIONATION OF POLYMERS

Albert N. De Vault and William N. Axe, Bartlesville, Okla., assignors to Phillips Petroleum Company, a corporation of Delaware Application October 1, 1954, Serial No. 459,732

8 Claims. (Cl. 260—93.7)

This invention relates to a process for fractionating polymers. In one aspect it relates to a novel solvent fractionation process. In another aspect it relates to a process for fractionating high polymers composed of fractions having different properties and uses.

The copending application of J. P. Hogan and R. L. Banks, Serial No. 333,576, filed January 27, 1953, discloses a class of unique polymers and a method for preparing these polymers. Briefly, the process comprises contacting a 1-olefin having a maximum chain length of 8 carbon atoms and no chain branching nearer the double bond than the 4-position with a catalyst comprising chromium oxide associated with at least one other oxide, particularly silica and/or alumina. When the olefin to be polymerized is ethylene, the preferred polymerization temperature is in the range 275 to 375° F. when the catalyst is used in the form of a fixed bed and 200 to 350° F. when a mobile catalyst is used. When the olefin to be polymerized is propylene or a heavier olefin, a temperature in the range 150 to 250° F. is ordinarily used. The process is operable, however, over a broader range, but is usually conducted within the range 150 to 450° F. When the olefin to be polymerized is propylene or a higher-boiling olefin, the product polymer, which includes all products produced by polymerization of the feed olefin, can be separated into three fractions: an oily fraction having a maximum boiling point in the range 850 to 900° F., and usually a boiling range of about 400 to 900° F., and a molecular weight in the range 200 to 500; a normally tacky fraction boiling above 900° F. and having a molecular weight in the range 500 to 5000; and a normally solid fraction having a molecular weight in excess of 5000, e. g. 5000 to 30,000 when propylene is the feed olefin. When propylene is polymerized, the solid fraction of the polymer has a melting point in the range 240 to 300° F., a density in the range 0.90 to 0.95, and an intrinsic viscosity in the range 0.2 to 1.0, as measured with a solution of the polymer in tetralin. The oily fraction of the polymer is useful as a lubricating oil or a lubricating oil additive, particularly as a viscosity index improver. The tacky fraction can be used as an adhesive or a component of adhesive compositions, for example, in the preparation of adhesive tapes, insulation, and laminated compositions. The solid polymer fraction can be used to form molded articles, can be extruded to form pipe and tubing and can be used as a component of protective coating compositions.

In view of the foregoing, it is clear that a method for the ready separation of the above fractions of the polymer is desirable. It is further desirable that the method utilize relatively inexpensive materials and that it be readily adaptable to large-scale, continuous operation. This invention provides such a separation method and utilizes the principle of solvent fractionation wherein the fractionating action of a relatively low-boiling hydrocarbon solvent is utilized. As compared with distillation methods, this invention has the advantage of relatively low-temperature operation.

According to this invention, a polymer which can be resolved into a viscous oily fraction, a tacky fraction, and a normally solid fraction is resolved into its components by contacting with a hydrocarbon solvent having from 3 to 4 carbon atoms per molecule to form a phase containing the greater part of one of said fractions and another phase containing the greater part of the others of said fractions, contacting the latter fractions, at a temperature at least as high as that in the first contacting step, with a hydrocarbon solvent which has a density different from that of said first-mentioned solvent, forming two phases, each containing the greater part of one of said latter fractions, separately collecting each of said phases, and recovering a polymer fraction from at least one of the three phases. Thus a polymer separable into fractions A, B and C, each having distinguishing properties, is resolved by contacting the polymer with a hydrocarbon solvent having 3 or 4 carbon atoms per molecule under such conditions that two phases are formed, the lighter of which will contain most of either A or A and B. The phase which contains the bulk of only one of the fractions, i. e., either A or C, is removed and the single component is recovered. The phase which contains the two components, i. e., either A and B or B and C, is further fractionated in the presence of a hydrocarbon solvent having a density different from that which the $C_3$ or $C_4$ hydrocarbon solvent has under the conditions of the first contacting, so that two phases are formed each of the remaining fractions being concentrated in one of said phases from which it is readily recoverable.

According to one embodiment of the invention, a polymer of the type already described is contacted with a $C_3$ or $C_4$ hydrocarbon, such as isobutane, so that two phases are formed, the lighter phase containing substantially all of the oily fraction and the heavier phase containing the tacky and the solid fraction. The lighter or extract phase is then treated for recovery of the oily fraction. The heavier phase is then contacted with a hydrocarbon solvent having a density different from that of the hydrocarbon previously used, e. g., a mixture of isobutane and isooctane, under conditions adapted to cause the formation of two phases. The lighter phase contains the tacky fraction which is recovered therefrom. The heavier phase contains the normally solid fraction which is likewise recovered therefrom.

According to another embodiment of the invention, the polymer is contacted with, for example, isobutane, as described in connection with the first embodiment but under such conditions that the lighter phase contains both the oily fraction and the tacky fraction and the heavier phase contains the normally solid fraction, which is recovered therefrom. The lighter phase is then subjected to conditions adapted to change its density so that the tacky fraction separates as a separate phase. The change in density can be effected by changing the temperature and/or by adding a lighter hydrocarbon, such as propane or ethane, for example. After the second phase separation, the oily fraction is recovered from the lighter phase and the tacky fraction from the heavier phase.

The hydrocarbon utilized as the fractionating solvent in the first step of this invention can be propane, propylene, isobutane, normal butane, a normal butylene, or isobutylene. Ordinarily, a paraffinic hydrocarbon is preferred on account of its relative chemical inertness and lower cost. A further preferred solvent is isobutane because it has optimum solvent power for the desired separation.

In the second fractionation step, when it is desired to reduce the density of the fractionating solvent, this can be accomplished by raising the temperature or by adding a lighter hydrocarbon as previously indicated. When it is desired to increase the density, a heavier hydrocarbon such as a $C_7$ to $C_9$ hydrocarbon, e. g., 2,2,4-trimethylpentane (isooctane), n-heptane, 2-methylhexane, n-octane, or 2,6-dimethylheptane, is utilized in admixture with the hydrocarbon utilized in the first fractionation step. Alternatively, a hydrocarbon of intermediate molecular weight, e. g., a pentane or a hexane can be used as the sole fractionating solvent in the second step.

The temperature conditions utilized in each step will depend upon the particular solvent used and the particular separation desired. The temperatures in general can be within a range the lower limit of which is defined by the cloud point, i. e. the temperature at which particles of solid appear in the solvent-rich phase (ordinarily about 200° F.) and the upper limit of which is the temperature at which the polymer begins to decompose. Although temperatures above the critical temperature of the solvent can be used, as a practical matter, it is preferable to use a temperature not greater than the critical temperature of the solvent, since a greater solvent power and lower pressure accompany temperatures below the critical. A pressure sufficient to maintain the solvent substantially in the liquid phase is desired. The volume ratio of solvent to polymer is generally in the range 5:1 to 40:1. When a mixture of a $C_3$ to $C_4$ hydrocarbon with a $C_7$ to $C_9$ hydrocarbon is utilized in the second fractionation stage, it is preferred that a volume raito of 2:1 to 10:1 of the heavier hydrocarbon to polymer be used.

Figure 1:
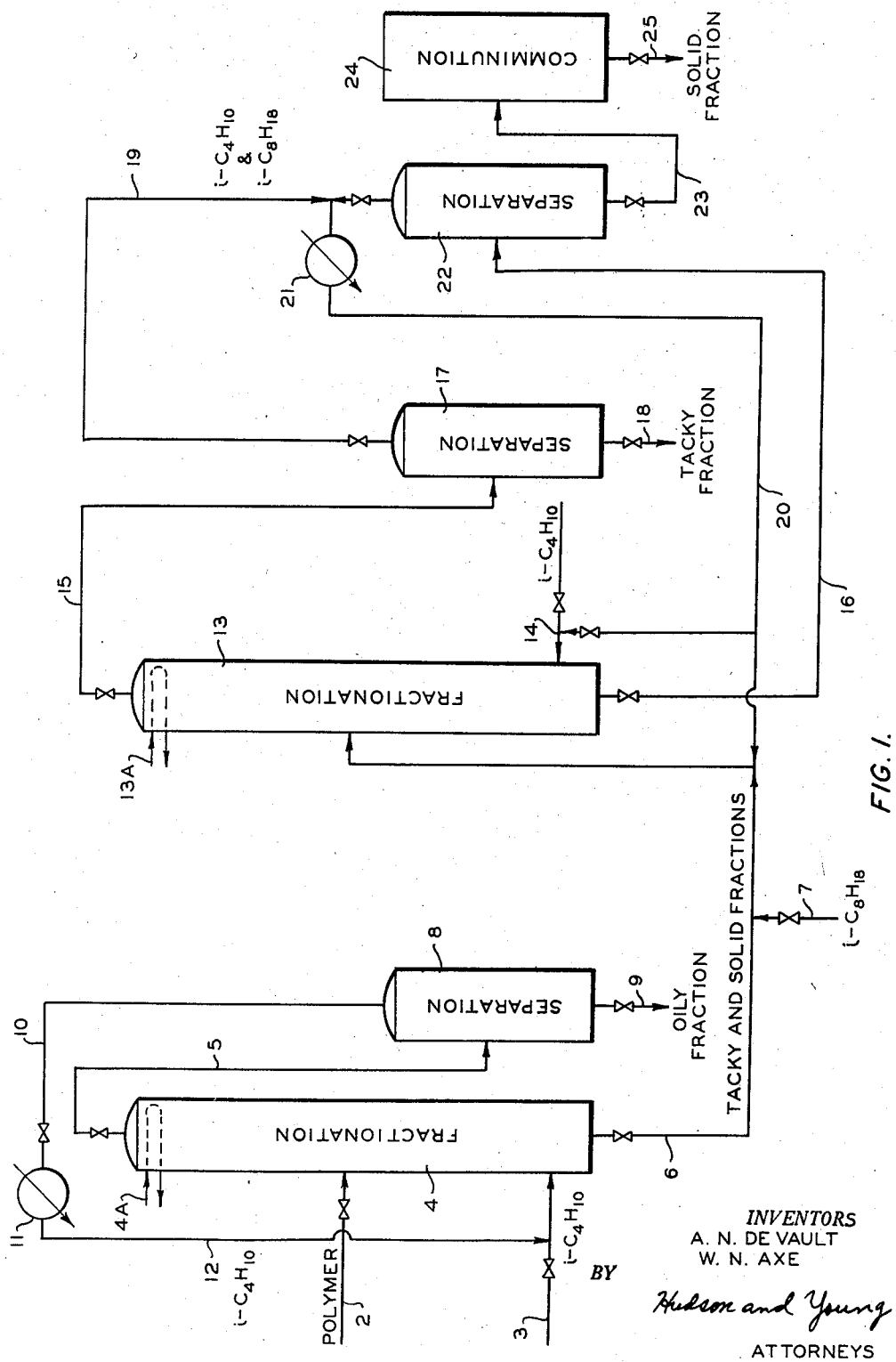
Figure 1 is a flow diagram illustrating one embodiment of the invention.

As illustrated in Figure 1, a polymer of the type described enters fractionation zone 4 through inlet 2. Isobutane, or other $C_3$ or $C_4$ hydrocarbon, enters fractionation zone 4 through inlet 3. Although fractionation zone 4 can comprise one or more single-stage contactors, such as a pressure tank equipped with a stirring device and connected to a settling tank, it is preferred that a countercurrent contacting device such as a column be utilized. In this type of equipment, the polymer and the liquid isobutane countercurrently contact each other in the lower part of the column, the polymer entering at an intermediate level and the isobutane at a lower level. A temperature gradient is maintained between the top and the bottom of the column, as for example, by the use of steam coil 4A. Thus the bottom of the column can be maintained at approximately 240° F. and the top at approximately 260° F. Since the critical temperature of isobutane is approximately 275° F. and the critical pressure is approximately 529 p. s. i. a., these values represent preferred upper limits for the temperature and pressure in fractionation zone 4. When the fractionation zone is operated in the range 240 to 260° F., a gauge pressure of 500 p. s. i. is satisfactory for the maintenance of liquid-phase conditions.

A lighter or extract phase composed mainly of solvent and dissolved oily fraction is removed from the fractionation zone 4 through conduit 5. A heavier phase composed mainly of the tacky and normally solid fractions, with a relatively small amount of isobutane, is withdrawn through conduit 6.

The lighter fraction is passed to separation zone 8, which can be an apparatus adapted for flashing or distilling the isobutane from the mixture. The isobutane is passed through conduit 10 and condenser 11 and recycled to fractionation zone 4. The oily fraction is recovered through outlet 9.

The heavier phase, passed through conduit 6, is diluted with a heavier hydrocarbon such as isooctane supplied through inlet 7, and the resulting mixture is passed to fractionation zone 13, which can be of the same type as fractionation zone 4. Isobutane is added through inlet 14 and contacts the polymer mixture. Fractionation zone 13 can be operated at substantially the same temperature and pressure conditions as those which exist in fractionation zone 4, steam coil 13A being utilized to produce the temperature gradient in the column, when a column is used. In fractionation zone 13 the mixture separates into two liquid phases, the lighter of which is composed of tacky fraction and solvent and the heavier of which is mainly normally solid fraction, with a small amount of solvent. The lighter phase is passed through conduit 15 to separation zone 17 from which the tacky fraction is recovered through outlet 18. The solvent mixture of isobutane and isooctane is recovered as an overhead fraction through conduit 19, is condensed in condenser 21 and recycled through conduits 20 and 6 and/or 14.

The heavier phase is passed through conduit 16 to separation zone 22, from which isooctane and isobutane are recovered and recycled through conduit 20 and condenser 21. The normally solid polymer fraction, ordinarily molten, is passed through conduit 23 to comminution means 24, which can comprise any known apparatus for the production of plastic materials in the form of cylindrical segments, granules, flakes, spheres, or other form which facilitates the handling of the solid material prior to the fabrication or formulation thereof into a desired article or composition. The comminuted solid fraction is recovered through outlet 25.

Figure 2:
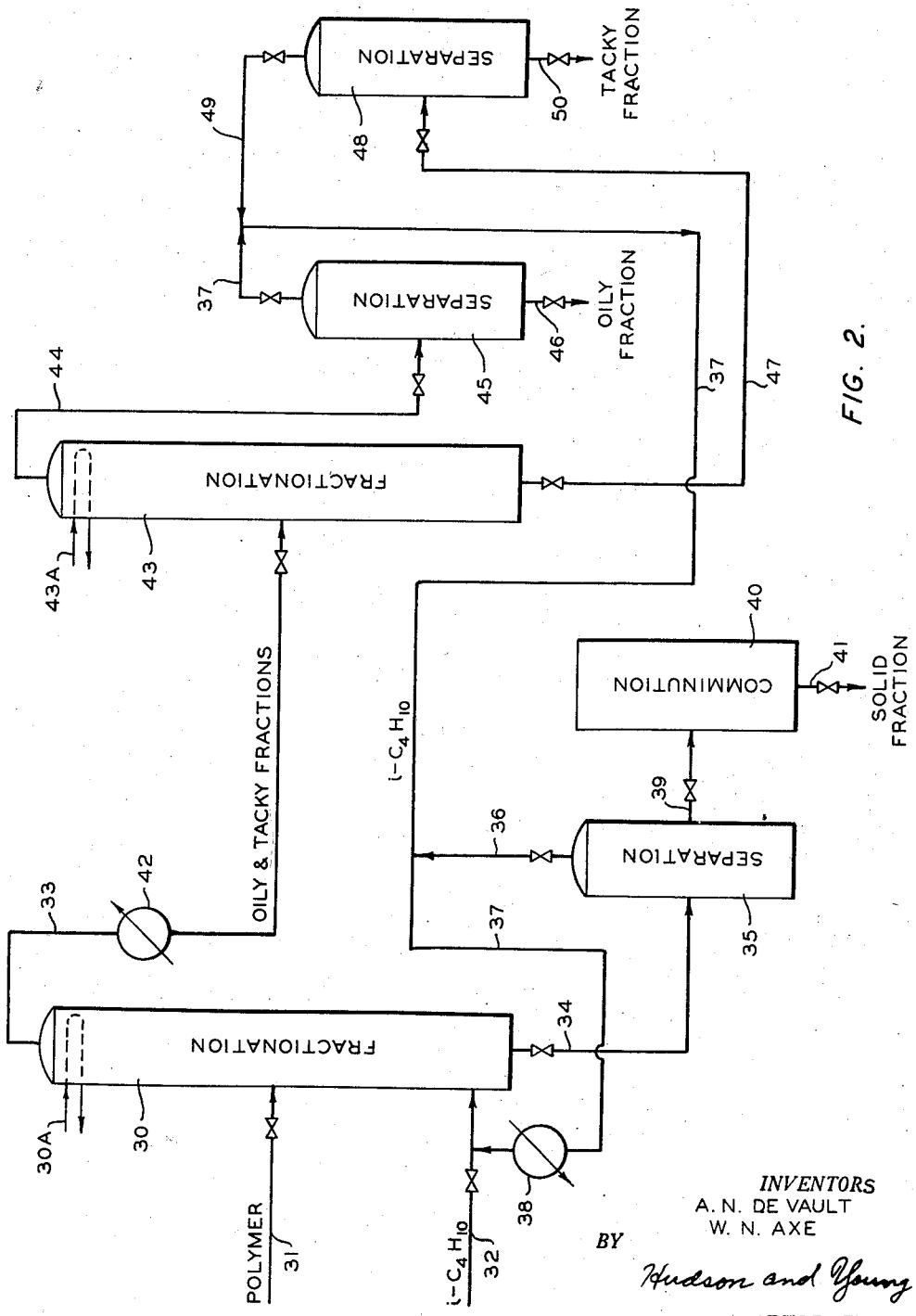
Figure 2 is a flow diagram of a second embodiment of the invention.

As shown in Figure 2, polymer and isobutane enter fractionation zone 30 through conduits 31 and 32, respectively. In this embodiment, fractionation zone 30, which is similar to the fractionation zones already discussed, is operated at a temperature in the range 220 to 240° F. The upper part of the column, when a column is used, is maintained at the higher of these temperatures by the use of steam coil 30A. The pressure in fracitonation zone 30 is ordinarily approximately 450 p. s. i. Under these conditions, two liquid phases form, the lighter of which is composed of isobutane, the oily fraction, and the tacky fraction, and the heavier of which is the normally solid fraction with relatively small amounts of isobutane. The lighter fraction is withdrawn through conduit 33. The heavier fraction is withdrawn through conduit 34 and passes to separation zone 35, in which the isobutane is recovered and recycled through conduits 36 and 37 and condenser 38. The normally solid fraction is passed through conduit 39 to comminuation zone 40 and recovered in comminuted form through outlet 41, as previously described.

The lighter phase is passed through conduit 33 and heat exchanger 42, wherein the temperature is raised, and enters fractionation zone 43, wherein the temperature is higher than in fractionation zone 30 and a temperature gradient is maintained by the use of steam coil 43A. Additional isobutane and/or a lighter hydrocarbon can be added, e. g. at the bottom of the column, through means not shown. Fractionation zone 43 is maintained at a temperature in the range 250 to 270° F. and a pressure of approximately 520 p. s. i. A light phase comprising isobutane and oily fraction is removed through conduit 44, and a heavier phase comprising mainly the tacky fraction with small amounts of isobutane is removed through conduit 47. The light phase is fractionated in separation zone 45 to recover isobutane, which is recycled through conduit 37, and oily fraction which is recovered through outlet 46.

The heavier phase passes through conduit 47 to separation zone 48, from which isobutane is recovered through conduit 49 and recycled through conduit 37 and tacky fraction is recovered through outlet 50.

*Example I*

A propylene polymer is produced by contacting a 2 weight percent solution of propylene in isooctane at a temperature of 190° F. and a pressure of approximately 450 p. s. i. with a catalyst prepared by impregnating a 90 weight percent silica-10 weight percent alumina co-precipitated composite with an aqueous solution of chromic acid, followed by drying and heating at 950° F. in a stream of anhydrous air for 5 hours. The resulting catalyst contains 2.5 weight percent chromium in the form of chromium oxide, part of the chromium being in the hexavalent form. The effluent from the reaction zone is fractionated to remove the isooctane and recover a polymeric product.

This product is passed into the mid-point of a vertical cylindrical column having staggered horizontal baffles at the rate of approximately 100 volumes per hour. Isobutane is passed, in the liquid phase, into the bottom of the column at the rate of 2000 volumes per hour. The bottom of the column is maintained at a temperature of 220° F. and the top at 240° F. The bottom product from the column is passed to a flash zone from which 15 volumes per hour of molten normally solid polymer are obtained. This polymer has a melting point of 251° F. and a molecular weight of approximately 10,000. It can be used for the fabrication of molded containers.

The overhead or extract fraction from the column comprises approximately 1,985 volumes per hour of isobutane and 85 volumes of polymer. It is passed to a second column similar to the first column. The bottom temperature of the second column is 250° F. and the top temperature is 270° F. From the top of the column is withdrawn a mixture of 3,470 parts of isobutane and 70 parts by volume of oily polymer, additional isobutane having been added at the base of the second column. The bottom fraction from the second column comprises 15 volumes of isobutane and 15 volumes of tacky polymer per hour.

The oily polymer, which has a boiling range of 415 to 896° F. and a molecular weight of 450, is useful as a V. I. improver for lubricating oils. The tacky polymer is used as an adhesive component for insulating tape, and has a molecular weight of 3800.

*Example II*

A propylene polymer prepared as described in Example I is passed into the middle section of a vertical column of the type described in Example I, at the rate of 100 volumes per hour. Isobutane is supplied to the bottom of the column at the rate of 2900 volumes per hour. The bottom of the column is maintained at a temperature of 240° F. and the top at 260° F. The column pressure is 500 p. s. i. A light phase comprising isobutane and polymer oil is recovered and fractionated to obtain 70 parts of polymer oil having the characteristics described in connection with Example I.

The bottom fraction from the column, comprising 30 volumes of polymer and 30 volumes of isobutane per hour, is mixed with 150 volumes per hour of isooctane and passed to a second column which operates under the same temperature and pressure conditions as the first column. 770 volumes of isobutane per hour are supplied to the bottom of the second column.

The overhead or extract fraction from the second column is passed to a stripping tower from which 15 volumes per hour of tacky polymer are recovered as kettle product. The bottom fraction from the second tower is passed to an evaporator, and 15 volumes per hour of normally solid polymer of the type described in Example I is recovered.

In an operation of the type described in Example II, normal pentane, for example, can be used as the sole solvent in the second step. Ordinarily from 1 to 2 volumes of pentane is added to the bottom fraction from the first solvent fractionation to facilitate pumping. When normal pentane is used as the sole solvent in the second fractionation step, the top tower temperature in the second step is preferably about 360° F. and the bottom temperature is approximately 340° F. A column pressure of approximately 420 p. s. i. is sufficient for liquid-phase operation, although higher pressures are satisfactory. Approximately 300 to 600 volumes of pentane per volume of polymer is used. At least part of the pentane is preferably contacted countercurrently with the polymer feed in the second step. A system of the type shown in Figure 1 is adaptable to this mode of operation. From 1 to 2 volumes of n-pentane (isopentane, n-hexane or any of the isohexanes can likewise be used) is added through inlet 7 and the remainder of the n-pentane through inlet 14, the operation of zones 13, 17, and 22 being correspondingly modified, as previously indicated.

From the foregoing it will be seen that this invention provides a process whereby a polymer containing, for example, three fractions having different properties and uses can be resolved into said fractions by a first-stage solvent fractionation which produces one of said fractions separate from the others and by further separating the other fractions from each other in a second-stage solvent fractionation under conditions such that the fractionating solvent has a density different from that utilized in the first stage. While certain process steps, structures and examples have been described for purposes of illustration, it is clear that the invention is not limited thereto. Although the invention is generally applicable to any polymer which can be resolved into fractions having different properties, it is particularly applicable to olefin polymers of the type described in the cited application of Hogan and Banks. While the process is applicable to polyethylenes of the type described in said application, it is more frequently applied to polymers of propylene and heavier olefins, since polyethylene produced by the process of the cited application ordinarily contains only small amounts of fractions other than a normally solid fraction. While the invention has been described chiefly with respect to a propylene polymer, other 1-olefins such as 1-hexene, 1-butene, 1-octene and 1-pentene produce polymers which are fractionatable according to the process of this invention.

The molecular weights discussed herein are obtained according to the equation $$M = \frac{4.03 \times 10^3 \times N_i \times 14}{2.303}$$

wherein M is the molecular weight and $N_i$ is the intrinsic viscosity as determined for a solution of 0.2 gm. of polymer in 50 cc. of tetralin at 130° C.

We claim:

1. A process for fractionating a polymer which is at least partially soluble in isobutane at conditions subsequently described herein and which is resolvable into a viscous oily fraction, a tacky fraction and a normally solid fraction which process comprises contacting said polymer with isobutane in a first zone at a temperature in the range 240 to 260° F., forming an isobutane-rich phase and a polymer-rich phase, recovering said oily fraction from said isobutane-rich phase, adding a hydrocarbon having from 7 to 9 carbon atoms per molecule to said polymer rich phase, contacting the resulting mixture with isobutane in a second zone at a temperature in the range 240 to 260° F. to form a liquid phase containing most of said tacky fraction and a liquid phase containing most of said normally solid fraction, separately collecting the latter-mentioned phases, and recovering a polymer fraction from each phase.

2. A process according to claim 1 wherein said polymer is a propylene polymer and said hydrocarbon having from 7 to 9 carbon atoms per molecule is 2,2,4-trimethylpentane.

3. A process according to claim 1 wherein the contacting in each zone is countercurrent, an upper part of each zone being maintained at a temperature substantially higher than a bottom part thereof.

4. A process according to claim 1 wherein said polymer is a propylene polymer and said hydrocarbon having from 7 to 9 carbon atoms per molecule is normal heptane.

5. A process according to claim 1 wherein said polymer is a propylene polymer and said hydrocarbon having from 7 to 9 carbon atoms per molecule is 2,6-dimethylheptane.

6. A process for fractionating a polymer of an aliphatic 1-olefin having a maximum chain length of 8 carbon atoms and no branching nearer the double bond than the 4-position, which polymer is at least partially soluble in a low boiling hydrocarbon, under conditions subsequently described, and is resolvable to a viscous oily fraction, a tacky fraction and a normally solid fraction, which process comprises contacting said polymer with a liquefied low boiling saturated hydrocarbon having from 3 to 4 carbon atoms per molecule and dissolving a substantial proportion of said viscous oily fraction in said light hydrocarbon; recovering a phase rich in the light hydrocarbon; recovering dissolved viscous oily fraction from said phase rich in said light hydrocarbon; recovering a phase rich in the other fractions of said polymer; contacting the last-mentioned phase with a mixture of a liquefied light hydrocarbon, as previously defined herein, with a hydrocarbon having from 7 to 9 carbon atoms per molecule and dissolving a substantial proportion of said tacky fraction in the described hydrocarbon mixture; recovering a phase rich in said low boiling hydrocarbon and said hydrocarbon having from 7 to 9 carbon atoms per molecule; recovering the described tacky fraction from said last-mentioned phase; recovering a phase rich in said normally solid fraction; and recovering said normally solid fraction therefrom.

7. A process for fractionating a polymer resolvable into a viscous, oily fraction, a tacky fraction and a normally solid fraction, which process comprises contacting said polymer in a first contacting step with a solvent hydrocarbon having from 3 to 4 carbon atoms per molecule to form a lighter phase relatively rich in said solvent and containing at least the greater part of said oily fraction and a heavier phase comprising said solid fraction, recovering said oily fraction from said lighter phase, contacting said heavier phase in a second contacting step with a solvent comprising a hydrocarbon having from 5 to 9 carbon atoms per molecule to form two phases, one of which is enriched with respect to said tacky fraction, separately collecting the latter mentioned phases and recovering a polymer fraction from at least one such phase.

8. A process according to claim 7 wherein the solvent in the first contacting step is isobutane and that in the second step is n-pentane.

References Cited in the file of this patent
UNITED STATES PATENTS

| | | |
|---|---|---|
| 2,658,059 | Peters et al. | Nov. 3, 1953 |
| 2,692,259 | Peters | Oct. 19, 1954 |

OTHER REFERENCES

Graff: Ind. Eng. Chem., 32, 294–298 (March 1940).